(12) United States Patent
Pearson et al.

(10) Patent No.: US 11,312,517 B2
(45) Date of Patent: Apr. 26, 2022

(54) ASSEMBLY FOR FORMING BAGS

(71) Applicant: TNA Australia Pty Limited, Lidcombe (AU)

(72) Inventors: Brian Pearson, Lidcombe (AU); Andre Tombuelt, Wittringen (DE)

(73) Assignee: TNA Australia Pty Limited, Lidcombe (AU)

( * ) Notice: Subject to any disclaimer, the term of this patent is extended or adjusted under 35 U.S.C. 154(b) by 147 days.

(21) Appl. No.: 16/899,014

(22) Filed: Jun. 11, 2020

(65) Prior Publication Data
US 2020/0391895 A1    Dec. 17, 2020

(30) Foreign Application Priority Data

Jun. 13, 2019  (AU) ................................ 2019902066

(51) Int. Cl.
| | |
|---|---|
| *B65B 9/207* | (2012.01) |
| *B65B 57/00* | (2006.01) |
| *B65B 51/30* | (2006.01) |
| *B65B 61/28* | (2006.01) |
| *B65B 57/04* | (2006.01) |
| *B65B 31/04* | (2006.01) |

(Continued)

(52) U.S. Cl.
CPC ............ *B65B 9/207* (2013.01); *B65B 9/2007* (2013.01); *B65B 31/045* (2013.01); *B65B 51/306* (2013.01); *B65B 57/00* (2013.01); *B65B 57/04* (2013.01); *B65B 57/08* (2013.01); *B65B 57/16* (2013.01); *B65B 61/28* (2013.01); *G01M 3/00* (2013.01); *G01M 3/36* (2013.01)

(58) Field of Classification Search
CPC ..... B65B 9/207; B65B 9/2007; B65B 31/045; B65B 51/306; B65B 57/00; B65B 57/02; B65B 57/04; B65B 57/08; B65B 57/16; B65B 61/28; G01M 3/00; G01M 3/36
USPC .... 53/53, 503, 511, 551, 374.5; 73/41, 45.4, 73/49.3, 52
See application file for complete search history.

(56) References Cited

U.S. PATENT DOCUMENTS

| | | | |
|---|---|---|---|
| 4,663,917 A * | 5/1987 | Taylor et al. | ........ B65B 9/2007 53/552 |
| 5,279,098 A | 1/1994 | Fukuda | |

(Continued)

FOREIGN PATENT DOCUMENTS

| | | | |
|---|---|---|---|
| CA | 2459651 A1 * | 9/2005 | ............. B65B 61/28 |
| DE | 3613244 A1 | 1/1987 | |

(Continued)

OTHER PUBLICATIONS

Spanish Search Report of corresponding Spanish Patent Application No. 202030574, dated Sep. 8, 2020 (six pages).

(Continued)

*Primary Examiner* — Stephen F. Gerrity
(74) *Attorney, Agent, or Firm* — Kilpatrick Townsend & Stockton LLP (57) ABSTRACT

An assembly for forming bags, having a belt drive for feeding a film at a film speed to a former shoulder to form a tubular film, a set of jaws movable at a jaw speed to engage and seal a tubular film to form a closed bag, and a sensor assembly to provide a volume signal indicative of a volume of the closed bag, wherein the controller is configured to adjust at least one of the film speed and the jaw speed in response to the volume signal.

17 Claims, 8 Drawing Sheets

(51) Int. Cl.
    *B65B 57/08*     (2006.01)
    *B65B 9/20*     (2012.01)
    *B65B 57/16*     (2006.01)
    *G01M 3/36*     (2006.01)
    *G01M 3/00*     (2006.01)

(56) References Cited

U.S. PATENT DOCUMENTS

| | | | | |
|---|---|---|---|---|
| 5,753,067 | A * | 5/1998 | Fukuda et al. | B65B 51/306 53/451 |
| 6,367,230 | B1 | 4/2002 | Fukuda | |
| 6,711,874 | B1 * | 3/2004 | Nakagawa et al. | B65B 51/306 53/551 |
| 2003/0213217 | A1 * | 11/2003 | Kondo et al. | B65B 9/2007 53/545 |
| 2004/0035189 | A1 * | 2/2004 | Tsoukalas et al. | G01M 3/36 73/41 |
| 2008/0086986 | A1 * | 4/2008 | Noguchi et al. | B65B 9/207 53/558 |
| 2010/0199614 | A1 * | 8/2010 | Taylor et al. | B65B 51/306 53/550 |
| 2016/0297554 | A1 * | 10/2016 | Hashimoto et al. | B65B 9/2007 |
| 2021/0086925 | A1 * | 3/2021 | Koike et al. | B65B 51/306 |

FOREIGN PATENT DOCUMENTS

| | | | | |
|---|---|---|---|---|
| DE | 102006012038 A1 | * | 9/2007 | ............ G01M 3/36 |
| EP | 1 186 876 A2 | | 3/2002 | |
| EP | 3 505 459 A1 | | 7/2019 | |
| ES | 2 601 129 A2 | | 2/2017 | |
| ES | 2 663 198 A1 | | 4/2018 | |
| GB | 2520403 A | | 5/2015 | |
| JP | 2007050934 A | * | 3/2007 | ........... B65B 51/306 |
| WO | 2009/023894 A1 | | 2/2009 | |
| WO | 2018/213539 A1 | | 11/2018 | |

OTHER PUBLICATIONS

British Search Report of corresponding British Patent Application No. 2008851.4, dated Oct. 22, 2020 (two pages).

* cited by examiner

ASSEMBLY FOR FORMING BAGS

This application claims priority to Australian Application No. 2019902066, filed Jun. 13, 2019, the entirety of which is incorporated by reference herein.

FIELD

The present invention relates to the packaging industry, and in particular but not exclusively, to the packaging industry that employs vertical fill and form packaging machines that produce snack bags.

BACKGROUND

In the packaging industry, vertical fill and form machines are used to produce sealed bags of product. A particular example is the packaging of snack foods.

The bags are formed by the packaging machine, by the packaging machine providing the bag with a longitudinal seal and two transverse seals.

If the seals are not properly formed, the quality of the food contained in the bag degrades. As a particular example, in the manufacture of snack foods, a portion of the snacks being packaged, can be located in the seal, thereby degrading the quality of the seal.

Described in U.S. Pat. Nos. 6,202,476 and 6,041,646, are devices that have the aim of detecting faulty bags, in particular bags that leak.

It is a disadvantage of the above discussed packaging apparatus, that faulty bags can be produced and not be detected. However, a further disadvantage is that their operation is intermittent, and therefore slow.

Further to the above, as bags are being produced by the packaging machines, they are delivered to a conveyor below. The bags may assume a variety of configurations. This has the disadvantage of making it difficult to arrange the bags for the purposes of being contained within larger bags or boxes.

SUMMARY OF INVENTION

It is the object of the present invention to overcome or substantially ameliorate at least one of the above disadvantages, or at least provide a useful alternative to the above-mentioned devices.

In a first aspect the present invention provides an assembly for forming bags, the assembly including:
  a former shoulder;
  a controller;
  a belt drive controlled by the controller for feeding a film at a film speed to the former shoulder to form a tubular film moving in a film direction;
  a sealing device to seal the tubular film in a first sealing direction, the first sealing direction being parallel to the film direction;
  a set of jaws controlled by the controller and movable at a jaw speed to engage and seal the tubular film in a second sealing direction to form a first seal and a second seal in each bag, thereby forming a closed bag, wherein:
    the second sealing direction is generally perpendicular to the film direction, and
    the first seal of each closed bag is located in the tubular film at a distance along the film direction from the second seal of the closed bag;
  a conveyor to receive the closed bag and to convey the closed bag to a destination; and
  a sensor assembly operatively associated with the conveyor, to provide a volume signal, the volume signal being indicative of a volume of the closed bag, to the controller;
  wherein the controller can adjust at least one of the film speed and the jaw speed in response to the volume signal.

Preferably, the set of jaws includes a cooperating pair of stripper bars that are operable such that, prior to the set of jaws forming the second seal of a bag to be closed, the speed of the stripper bars differs from the film speed by a relative speed, and wherein the controller can adjust the relative speed in response to the volume signal.

Preferably, the stripper bars are movable by a stripping distance while the relative speed is non-zero, and wherein the controller can adjust the stripping distance in response to the volume signal.

Preferably, the stripper bars are movable for a stripping time while the relative speed is non-zero, and wherein the controller can adjust the stripping time in response to the volume signal.

Preferably, the controller can adjust the stripping time by adjusting the jaw speed and the film speed such that the relative speed does not change substantially.

Preferably, the assembly further includes a gas delivery device positioned adjacent the former shoulder to deliver an amount of gas into the tubular bag material prior to the set of jaws forming the second seal of a bag to be closed, and wherein the controller can adjust the amount of gas in response to the volume signal.

Preferably, the sensor assembly includes a first sensor, the sensor operable to detect an upper surface of the bag.

Preferably, the sensor assembly includes a second sensor, the second sensor being spaced from the first sensor in said conveyor direction so that the sensors are spaced along the conveyor, with both sensors being operable to provide the volume signal and the first sensor being upstream of the second sensor, and wherein each sensor detects the upper surface of the bag.

In a second aspect, the present invention provides an assembly for forming bags, the assembly including:
  a former shoulder;
  a controller;
  a belt drive controlled by the controller for feeding a film at a film speed to the former shoulder to form a tubular film moving in a film direction;
  a sealing device to seal the tubular film in a first sealing direction, the first sealing direction being parallel to the film direction;
  a set of jaws controlled by the controller and movable at a jaw speed to engage and seal the tubular film in a second sealing direction to form a first seal and a second seal in each bag, thereby forming a closed bag, wherein the second sealing direction is generally perpendicular to the film direction, and the first seal of each closed bag is located in the tubular film at a distance along the film direction from the second seal of the closed bag; the set of jaws including cooperating pairs of:
    closer bars for closing the tubular film;
    stripper bars for moving, prior to the set of jaws forming the second seal of a bag to be closed, at a speed that differs from the film speed by a relative speed; and
    sealing jaws for forming the first and second seal,
    wherein the closer bars, when the tubular film is closed, are separated by a first distance, and the stripper bars, when moving at the relative speed, are separated by a second distance, a conveyor to receive the closed bag and to convey the closed bag to a destination; and a sensor assembly operatively associated with the conveyor, to provide a volume signal, the volume signal being indicative of a volume of the closed bag, to the controller; and wherein the assembly includes:

a first distance adjustment device for adjusting the first distance and/or a second distance adjustment device for adjusting the second distance, wherein the controller can operate the first and/or second distance adjustment device in response to the volume signal.

Preferably, the assembly includes both first and second distance adjustment devices.

Preferably, the second distance adjustment device is operable independently from the first distance adjustment device.

Preferably, the first and/or second distance adjustment device include:

a rotationally asymmetric shaft positioned to abut the respective bars when the bars are at their closest separation, wherein:

the shaft is movable between a first position corresponding to a first magnitude of the respective distance, and a second position corresponding to a second magnitude of the respective distance.

Preferably, the shaft is rotationally asymmetric such that:

when the shaft is in the first position, a first chord of the shaft taken between contact positions of the shaft with the respective bars is equal to the first magnitude, and when the shaft is in the second position a second chord of the shaft taken between contact positions of the shaft with the respective bars is equal to the second magnitude.

Preferably, the first and second adjustment device include:

a rotationally asymmetric shaft having a first shaft profile at a contact position of the shaft with the closer bars and a second shaft profile at a contact position of the shaft with the stripper bars.

Preferably, the first distance adjustment device includes a first rotationally asymmetric shaft and the second distance adjustment device includes a second rotationally asymmetric shaft.

Preferably, the first and/or second adjustment device include a wedge assembly positioned to abut the respective bars when the bars are at their closest separation, the wedge assembly having:

a first wedge; and a second wedge, wherein the first and second wedge are movable relative to each other in a first wedge direction to change the dimension of the wedge assembly in a second wedge direction.

Preferably, the first wedge and the second wedge abut each other and each have a conforming profile, wherein the conforming profile includes a first slope at a first end of the wedge assembly and a second slope at a second end of the wedge assembly, such that:

when the first and second wedge are moved relative to each other in the first wedge direction to increase the dimension of the wedge assembly in the second wedge direction, the first and second wedge contact each other at the first slope and the second slope of the conforming profile.

Preferably, the assembly includes a compression device to engage each bag, the compression device including:

a resilient member, and at least one loop member that moves in unison with the conveyor, the loop member providing a mounting for the resilient member so that the resilient member moves in unison with said length to compress each bag.

Preferably, the resilient member includes a first resilient member mounted above the length and moved in unison with the conveyor in the conveyor direction but spaced from the conveyor so as to engage and compress each bag on the length, and the compression device includes further resilient members, with the further resilient members being spaced along the loop member.

Preferably, the resilient member includes an elongated spring extending generally horizontally, and transverse relative to the length.

Preferably, the elongated spring is longitudinally elongated transverse relative to the conveyor direction.

Preferably, said loop member includes a pair of chained loops, the chained loops being spaced with the resilient member extending therebetween.

Each of the above discussed preferable features and aspects may be used in combination with each other.

BRIEF DESCRIPTION OF DRAWINGS

Preferred forms of the present invention will now be described by way of example with reference to the accompanying drawings wherein.

DESCRIPTION OF EMBODIMENTS

In the accompanying drawings there is schematically depicted a packaging assembly 10. The assembly 10 includes a weighing machine 11 that includes a plurality of buckets 12 and 13 to which product is delivered from above, with the buckets 12 and 13 being operated to deliver batches of product to a chute 14. The chutes 14 deliver the batches of product to a former 15. The former 15 has a former shoulder 41 that receives strip bag material, and transforms the strip bag material into a tubular configuration that passes in a direction 16. The strip bag material engages the external surface of the former shoulder 41 to be configured into the tubular form. The tubular bag material passes downwardly through the upper opening 53 of the former shoulder 41. Disposed generally parallel to the direction 16 is a sealing device that is adapted to create a longitudinal seal 42 in the tubular bag material 27. In the preferred embodiment, the sealing device is a heater 28. The direction 16 is generally vertically downward.

The tubular bag material 27 is engaged by a film drive assembly 17 that pulls the strip material past the former shoulder 41, and delivers the tubular bag material 27 to the packaging machine 18 below.

Particularly as described in U.S. Pat. No. 4,663,917, the packaging machine 18 includes pairs of rotatably driven sealing jaws 31 that are rotatably driven about generally parallel but transversely spaced axes through repeated revolutions in the angular directions 33. Mounted with the sealing jaws 31, as described in U.S. Pat. No. 4,663,917, are cooperating pairs of stripper bars 49 for moving, prior to the sealing jaws 31 forming a seal, at a speed that differs from the film speed by a relative speed for inter alia stripping product from the area of the tubular film 27 where the seal is to be formed by the sealing jaws 31, and closer bars 50 (see FIGS. 4*a* to 4*c*) for closing the tubular film 27 at location above the sealing jaws 31.

Figure 5A:
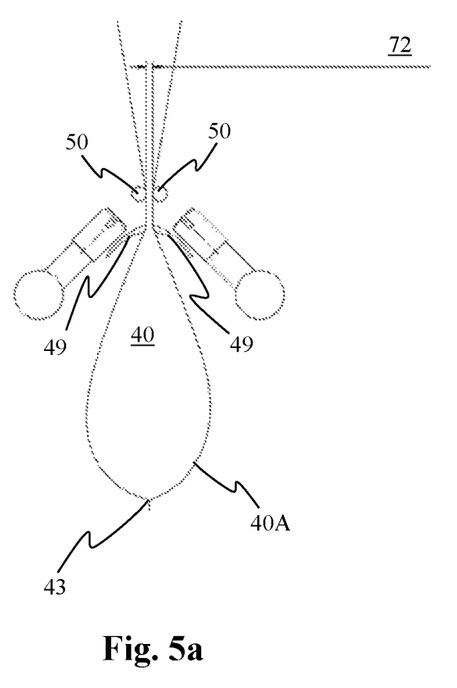
FIGS. 5a and 5b are schematic detailed section views of the assembly of FIG. 1 along the line A-A of FIG. 2.
Figure 5B:
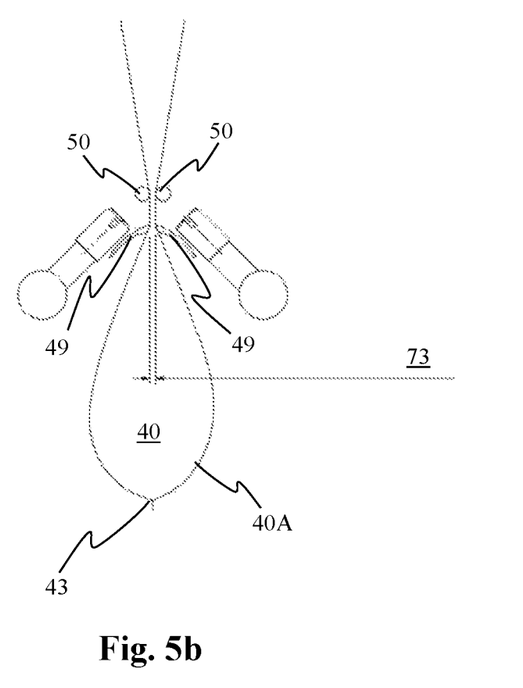
Figure 6:
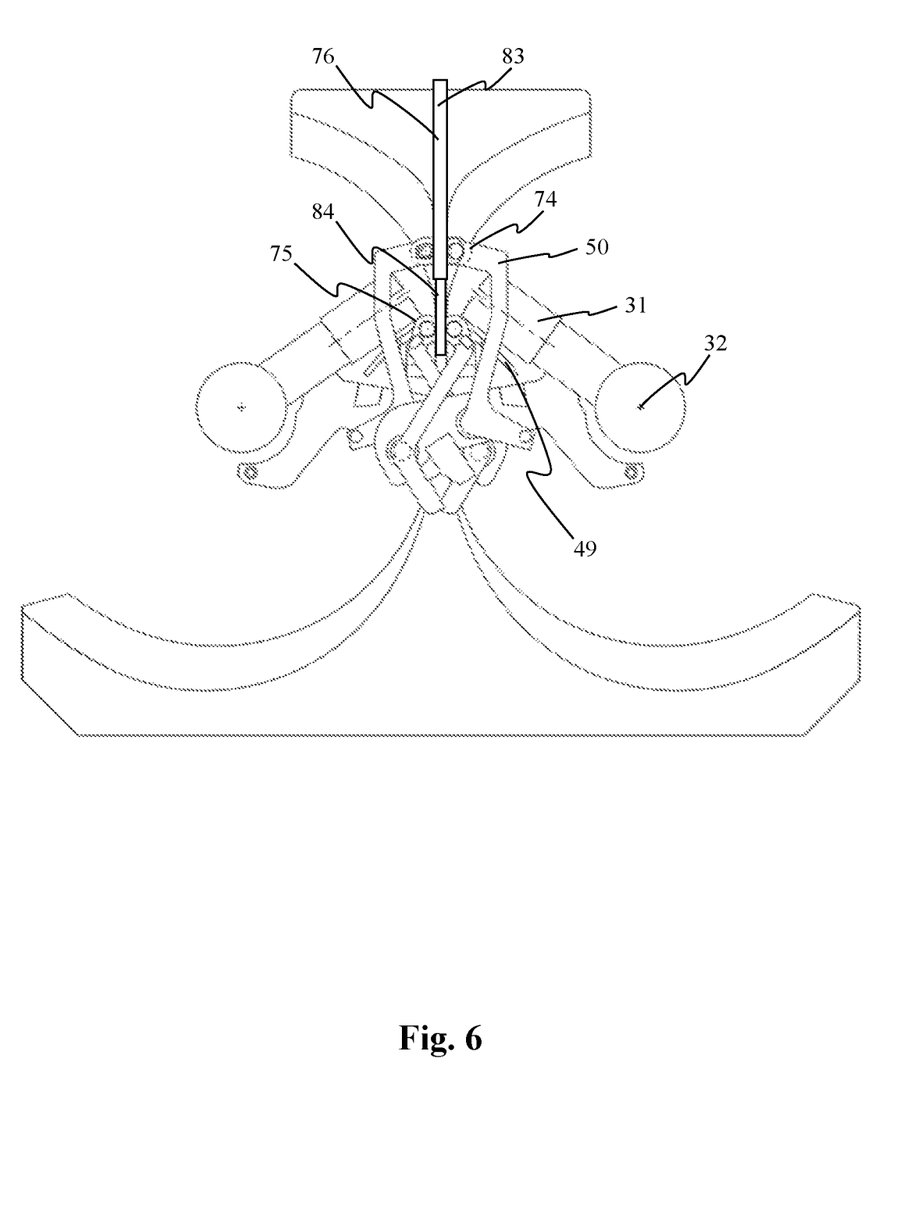
FIG. 6 is a detailed side view of a third alternative embodiment of the assembly of FIG. 1.

As seen in FIGS. 5*a* and 5*b*, the closer bars 50 are separated, when the tubular film 27 is closed by the closer bars 50, by a first distance 72. Similarly, the stripper bars 49 are separated, when moving at the relative speed, by a second distance 73. As seen in FIG. 6, the first distance 72 is at least of a base magnitude provided by a first distance spacer 74 provided on each closer bar 50 abutting against each other. The second distance is at least of a base magnitude provided by a second distance spacer 75 provided on each stripper bar 49 abutting against each other.

The former 15 has the former shoulder 41 as describe above, and a former base plate 49. The former shoulder 41 is mounted on the base plate 49 so as to be supported thereby. Also attached to the base plate 41 is a frame 50 that secures the chute 14 to the base plate 49. Also mounted on the base plate 49 is a backing bar 55 to resist pressure of the heater 28.

The film drive assembly 17 includes a pair of sub-assemblies 19A, 19B, the sub-assemblies 19A, 19B being located on opposite sides of the tubular bag material 27 and both engage the tubular bag material 27 to pull the tubular bag material 27 through the assembly 10. Preferably, the sub-assembly 19A is a rear sub-assembly and the sub-assembly 19B is a front sub-assembly, with the sub-assembly 19B engaging the tubular bag material adjacent the longitudinally overlapping edge portions of the tubular bag material. In an alternative embodiment, the sub-assemblies 19A, 19B, while engaging opposite portions of the tubular bag material, engage the tubular bag material on the lateral sides of the tubular bag material, that is the sub-assemblies 19A, 19B are both spaced from the overlapping longitudinal edge portions of the tubular bag material. More particularly the sub-assemblies 19A, 19B would be displaced 90° about the axis 54. The axis 54 is a generally upright central axis of the packaging machine 18 and former 15.

Each sub-assembly 19A, 19B includes a belt 20 that passes between a first idler roller (pulley) 21, a second idler roller (pulley) 22 and a drive pulley (roller) 23. The length of belt 20 passing between the idler rollers 21 and 22 provides a belt drive portion 24 that is generally linear and parallel to the direction 16. The portion 24 moves in the direction 16 so as to move the tubular bag material in the direction 16. The drive portion 24 is substantially vertical as the roller 21 is essentially vertically above the roller 22.

The belt 20 passes from the idler roller 22 to the drive pulley (roller) 23 so as to provide second belt portion 25. The belt portion 25 is generally horizontal, that is generally perpendicular (transverse) relative to the direction 16. The belt 20 passes about the pulley 23 to the idler roller 21 so as to provide a belt portion 35. The pulley 23 is spaced laterally from the portion 24.

The belt portion 24 follows a linear path generally parallel to the direction 16 and direction of extension of the tubular bag material 27. The belt portion 25 follows a generally linear path extending away from the tubular bag material 27 (and portion 24), so as to have a direction of extension away from the portions 24. The belt portion 35 has a direction of extension away from the belt portion 24. Preferably, the portion 25 is perpendicular to the portion 24.

The belt 20 passes in the direction 26 about the idler rollers 21 and 22 and drive pulley 23. The two belt portions 24 are generally parallel co-extensive but transversely spaced so as to be on opposite sides of the tubular bag material 27.

The drive pulleys 23 are driven by a drive control and motor assembly (not shown) so as to provide the tubular bag material 27 with a desired velocity profile (film speed). As mentioned previously, the tubular bag material 27 is driven in the direction 16. However, in a further preferred form the drive control and motor assembly may vary the velocity in the direction 16. The drive control and motor assembly includes a computer controlled servo motor (not shown) or motors to drive the pulley 23.

Each of the jaws 31 is mounted on a shaft 32 by means of jaw supports (arms) 47, with the shafts 32 being rotatably driven in opposite angular directions 33. Accordingly, the sealing jaws 31 are driven through repeated revolutions in synchronism about spaced generally parallel axes, the axes being generally transverse of the direction 16. The sealing jaws 31 engage the tubular bag material 27, transversely seal the bag material 27 creating an end seal 43, and cut the bag material 27 to form discrete bags 40.

The shafts 32 are driven by a jaw control and motor assembly (not shown), with the jaw control and motor assembly being operable to cause the shafts 32 to have a desired angular velocity profile (jaw speed). Preferably, the jaw control and motor assembly is operable so that the jaws 31 have a peripheral velocity, when adjacent each other, to engage with the tubular bag material 27, that is less than the velocity of the tubular bag material 27 at the belts 24. When the jaws 31 are engaged with the bag material 27 to form a seal therein, the jaws 31 have the same velocity as the bag material 27 between the jaws 31. Accordingly, the bag material 27, by moving with the jaws 31 when they are engaged with the bag material 27, changes in velocity.

As described in U.S. Pat. No. 4,663,917, the stripper bars 49 are connected to the shaft 32 by linkages (not shown) that can result in the velocity profile of the stripper bars 49 differing from the velocity profile of the shaft 32 by a relative speed. However, the jaws 31, stripper bars 49, and film drive assembly 17 still operate to produce a fixed number of bags 40 per minute, which requires the revolutions per minute of the stripper bars 49 to be equal to the revolutions per minute of the jaws 31 and shaft 32.

The jaw control and motor assembly includes a computer (not shown) and/or a servo motor (not shown) or motors for the shafts 32, with the computer programmed to operate the servo motor or motors to produce the desired angular velocity profile of the shafts 32.

The drive control and motor assembly, and the jaw control and motor assembly, may share a computer (not shown) that controls operation of the respective servo motors that drive the drive pulleys 23 and the shafts 32, so that the sealing jaws 31 are coordinated with the speed of the tubular bag material 27. However, it should also be appreciated that the computer could control the respective servo motors so that the sealing jaws 31 have a peripheral speed, when adjacent or engaged with the tubular bag material 27, that is different from the velocity provided to the tubular bag material 27 by the belt 20. For example, the jaws 31, and bag material 27 engaged therewith, may have a slower velocity causing product to settle towards the lower end of the bag, with the jaws 31 then increasing in speed when the transverse seal is to be formed in the bag. In another embodiment the jaws 31 may have a velocity opposite the direction of movement of the tubular bag material 27 when the jaws 31 are adjacent the material 27.

Figure 1:
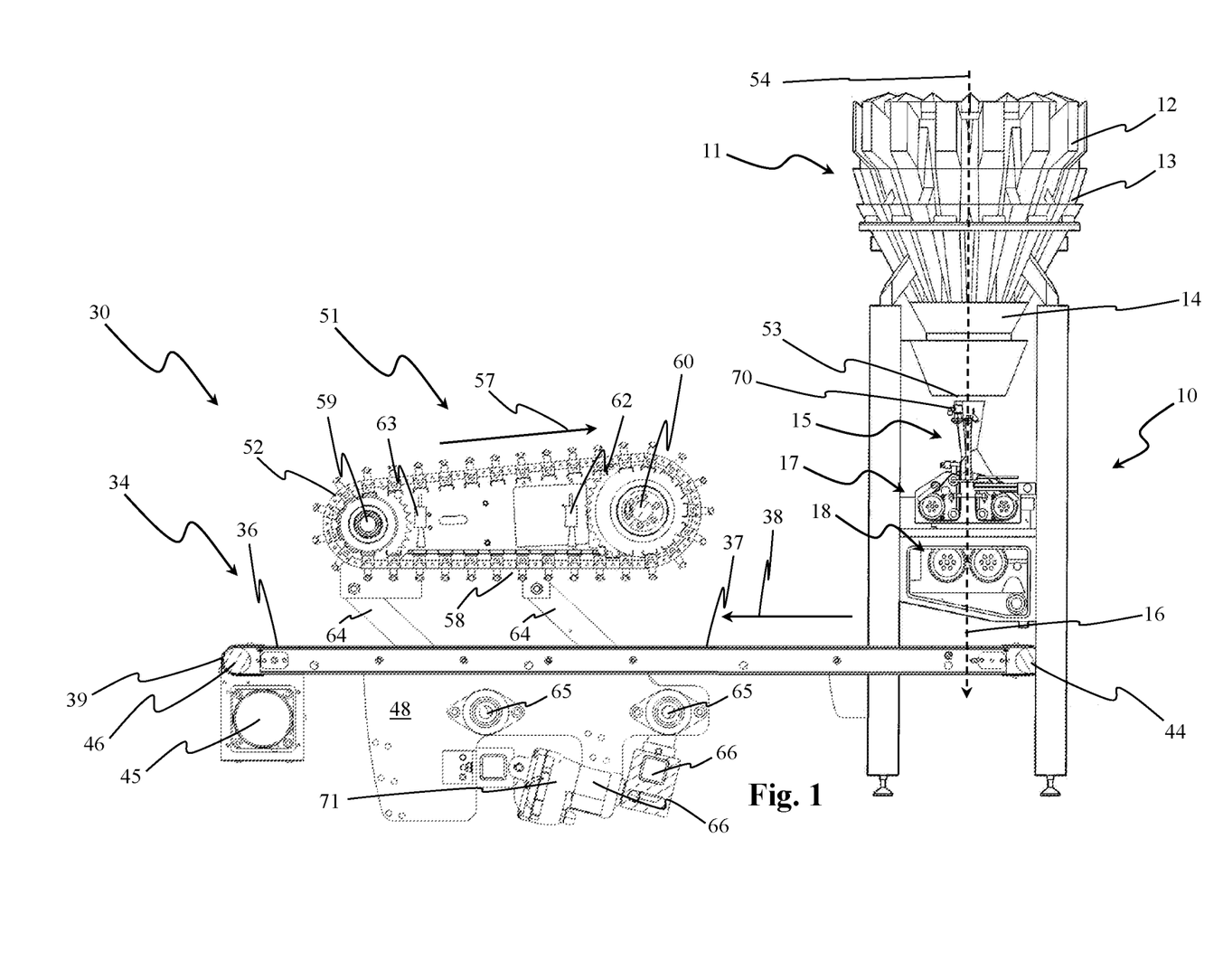
FIG. 1 is an assembly for forming bags, the assembly being sectioned along the line A-A of FIG. 2.
Figure 2:
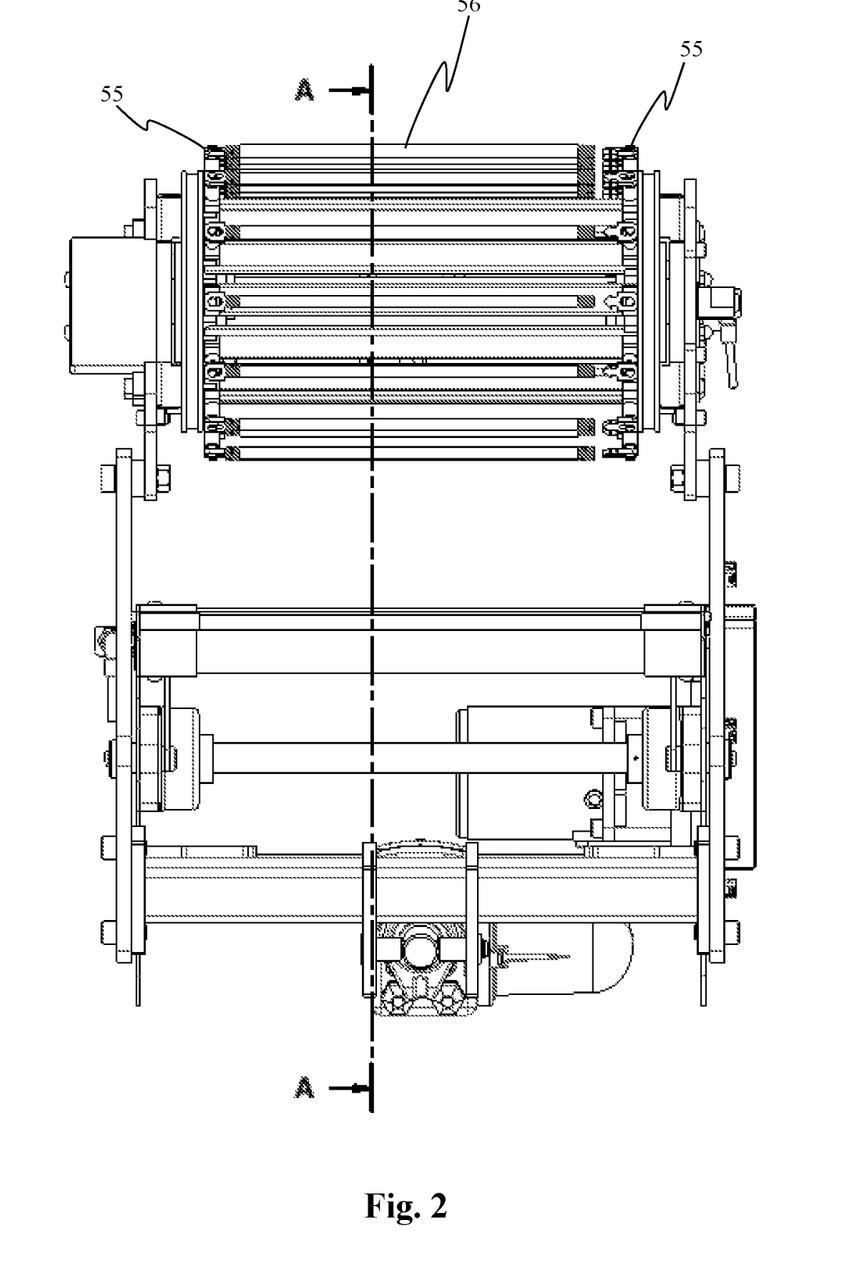
FIG. 2 is a schematic end elevation of the assembly of FIG. 1, excluding the weighing machine, the chute, the former, the film drive assembly, and the frame.
Figure 3:
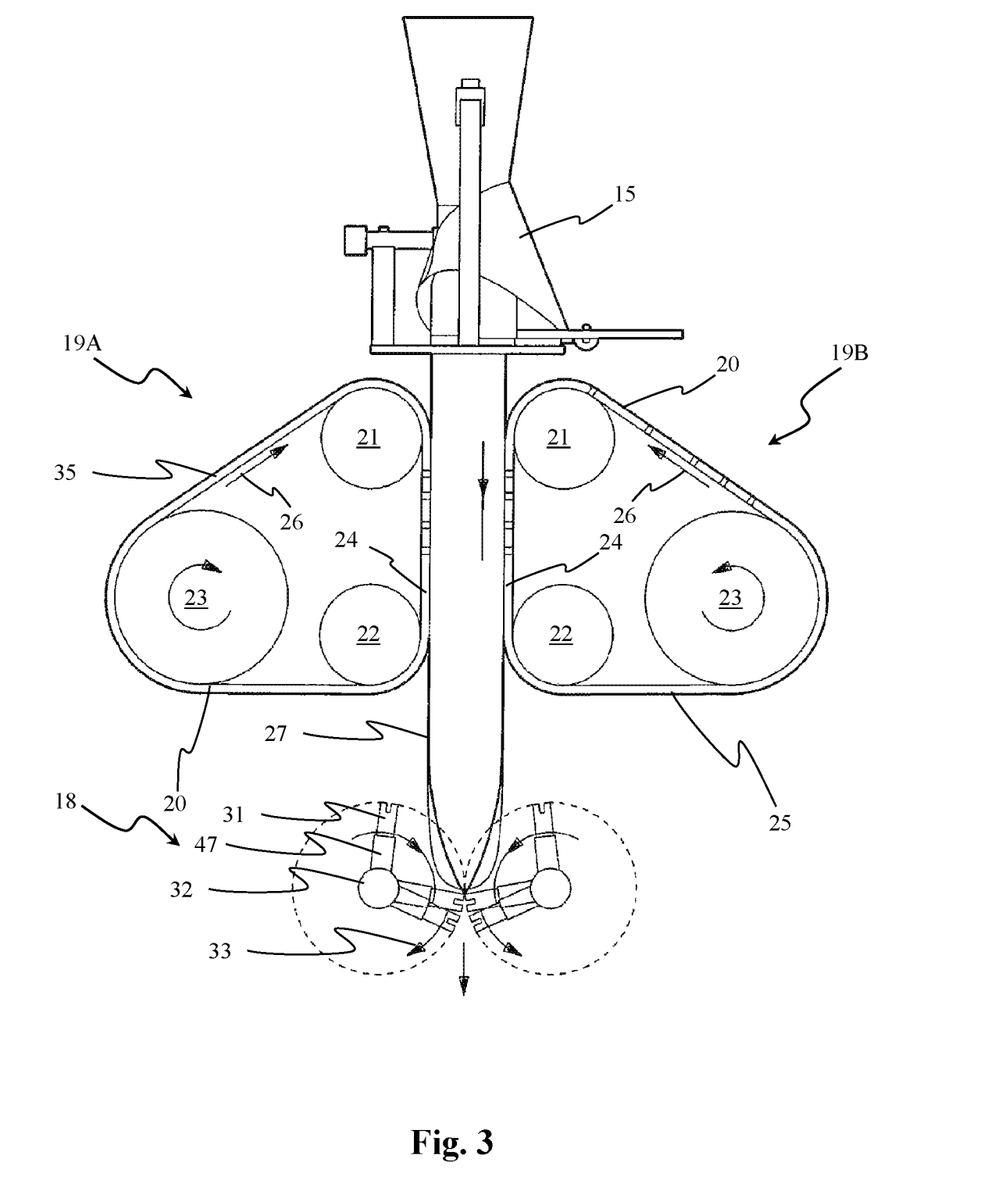
FIG. 3 is a schematic detailed section view of the assembly of FIG. 1 along the line A-A of FIG. 2.

In the preferred embodiment shown in FIG. 1, the packaging assembly 10 also includes a gas delivery device 70 mounted adjacent the former 15 to deliver an amount of gas into the tubular bag material 27. Preferably, the amount of gas is delivered into the tubular bag material 27 immediately prior to the set of sealing jaws 31 forming the second seal, or end seal 43 of a discrete bag 40 to be closed. The amount of gas is preferably an amount of inert gas, such as nitrogen, argon, or the like. The amount of gas displaces the oxygen-containing air in the discrete bag 40 and thereby inhibits reaction of the contents of the discrete bag 40 with the oxygen, resulting in undesirable deterioration of the texture and flavor of the contents of the discrete bag 40. The gas delivery device 70 is controlled by, for example, an electronically actuated solenoid gas valve (not shown), the central computer being adapted to control the solenoid gas valve to open and close the solenoid valve at a respective predetermined time relative to the motion of the sealing jaws 31.

In the accompanying drawings there is also schematically illustrated a conveyor assembly 30 to engage the closed bags 40 that contain the product. As a particular example, the bag 40 may be a bag containing snack foods. The bag 40 would have a longitudinal seal 42 and end seals 43. Each bag 40 is intended to have a predetermined volume and is sealingly closed.

The conveyor assembly 30 includes a conveyor 14. The conveyor 34 includes an endless belt 36 having an upper conveying length 37 that is moved in a conveying direction 38. The length 37 extends generally horizontally between a downstream end 39 and an upstream end 44, with the bags 40 conveyed in the direction 38 to the downstream end 39 from where the bags 40 are delivered from the conveyor assembly 30. The bags 40 rest on the length 37, as the length 37 provides an upwardly facing surface.

The conveyor 34 also includes a motor/gear box assembly 45 that drives the endless belt 36 in the direction 38 by means of a drive roller 46.

The conveyor 34 includes a base 48 upon which the endless belt 36 is mounted, while also mounted on the base 48 is a compression device 51. The compression device 51 engages the bags 40 and compresses the bags 40 against the length 37.

The compression device 51 includes a loop member 52 that includes two spaced, parallel chain loops 55 that support, and between which there extends, a plurality of springs (resilient members) 56. The springs 56 extend generally horizontally and transverse of the length 37.

The chain loops 55 are driven in a direction 57 so that a length 58 of the loop member 52 moves in the conveying direction 38 at the same speed as the length 37, so that the lengths 58 and 37 move in unison.

The chain loops 55 pass about an idler sprocket assembly 59 as well as a drive sprocket assembly 60. The drive sprocket assembly 60 includes a motor (not shown) that is coordinated with the motor 45 so that the lengths 37 and 58 move in unison in the conveying direction 38.

Mounted and/or operatively associated with the device 51 are a first and second sensor 62a, 62b forming a sensor assembly 63 with the first sensor 62a spaced from the second sensor 62b in the direction 38 toward the downstream end 39. Each of the sensors 62s, 62b detects an upper surface 40a of the bag 40, so as to provide a signal that is an indication of the depth of the bag 40, and therefore the volume of the bag 40. Thereby, the sensor assembly 63 provides a volume signal. However, the device 51 is also operable with only one of the sensors 62a, 62b, each sensor 62a, 62b being able of providing the volume signal.

As the bags 40 pass in the direction 38, they are compressed by the springs 56. Accordingly, if there is a leak in the bags 40, the volume of the bag 40 will decrease, so that when the upper surface 40A of the bag 40 is detected by the sensor 62b, a volume signal indicating a reduced volume compared to the volume indicated by the volume signal provided by the sensor 62a will be indicative of a bag 40 that leaks, being a faulty bag.

When compressing the bags 40, the springs 56 resiliently deform upwardly, and return to their rest position when not engaged with a bag 40.

The sensor assembly 63 communicates with a central computer, or controller (not shown), so as to identify the faulty bags 40 so that they can be removed from the process.

Further, the sensor assembly 63 is adapted to provide the volume signal to the central computer so as to compare the volume signal to a predetermined target volume range. The central computer is adapted to adjust, by providing controlling input to the drive control and motor assembly, and the jaw control and motor assembly, at least one of the film speed and the jaw speed in response to the volume signal.

Figure 4A:
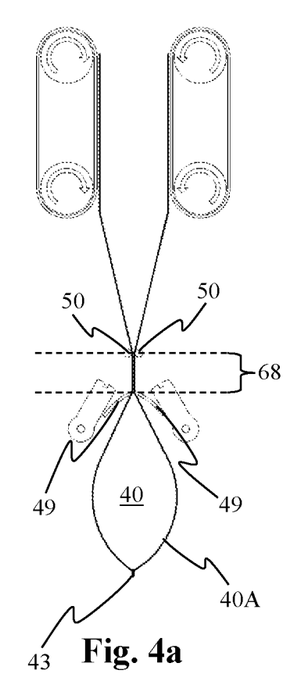
FIGS. 4a to 4c are schematic detailed section views of the assembly of FIG. 1 along the line A-A of FIG. 2.
Figure 4B:
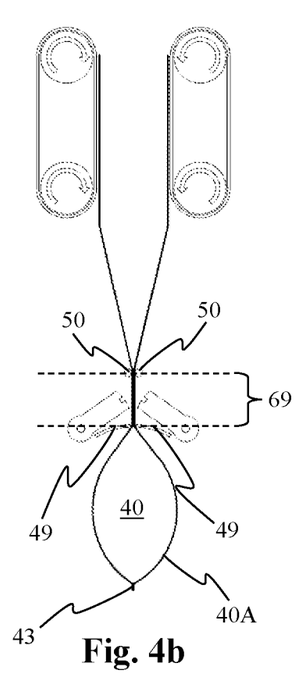
Figure 4C:
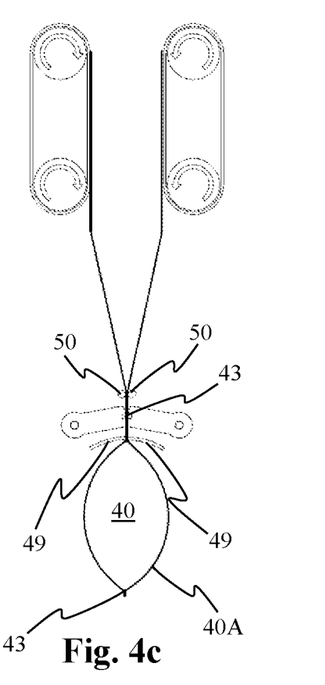

Adjusting the film speed, that is the desired velocity profile of the tubular bag material 27, and the jaw speed, that is the desired velocity profile of the jaws 31, allows the central computer to adjust a strip length 67 and a strip time. Stripping is the action of the stripper bars 49 coming together in compressive contact with the tubular bag material 27, as shown in FIGS. 4a to 4c, to strip product away from the portions of tubular bag material 27 that will be used to create the end seal 43. It will be appreciated that to effect stripping, the stripper bars 49 require a relative velocity to the tubular bag material 27.

The strip length 67 is the length of tubular bag material 27 across which the stripper bars 49 move during stripping, i.e. while the stripper bars 49 are in contact with the tubular bag material 27. The strip length is shown in FIGS. 4a and 4b. The increase between a first distance 68 in FIG. 4a and a second distance 69 in FIG. 4b is the strip length 67. The strip time is the time taken by the stripper bars 49 to traverse the strip length 67.

The volume of air in the bag 40 is affected by the strip length 67 and the strip time. For example, a larger strip length 67 would result in a higher volume of air in the bag 40, compared to a smaller strip length 67, as air is forced into the bag 40. Similarly, a longer strip time will result in a lower volume of air in the bag 40, compared to a shorter strip time, as air is allowed to escape the bag 40 during the strip motion before the bag 40 is sealed. The strip length 67 is adjusted by the central computer by adjusting a relative speed between the jaw speed and the film speed. The relative speed may be adjusted by increasing or decreasing the film speed and/or the jaw speed.

A high relative speed between the jaw speed and the film speed results in the stripper bars 49 traversing a larger strip length 67 on the tubular bag material 27 before being moved away from the tubular bag material 27. Similarly, when the jaw speed and film speed are very similar, and there the relative speed is low, the stripper bars 49 traverse a shorter strip length 67 on the tubular bag material 27 before being moved away from the tubular bag material.

The strip time is adjusted by the central computer by increasing or decreasing the jaw speed. If no effect on strip length 67 is required, the central computer concurrently increases or decreases the film speed to ensure that the relative speed does not change. An increased jaw speed results in the stripper bars 49 traversing the strip length 67 more quickly.

Thus, by adjusting at least one of the film speed and the jaw speed in response to the volume signal the central computer is adapted to adjust the volume of air in subsequent bags 40 in response to the volume signal from at least one of the sensors 62a, 62b indicating that the volume of air in the bags 40 detected by the sensors 62a, 62b does not fall within the predetermined target volume range.

The central computer can also adjust the amount of gas delivered by the gas delivery device 70 in response to the volume signal. For example, in response to a volume signal indicating that the volume of air in the bags 40 is below the target volume range, the central computer can increase the amount of gas delivered by the gas delivery device 70, thereby increasing the volume of air in the bags 40 when the end seal 43 is formed by the sealing jaws 31. Similarly, the central computer can decrease the amount of gas delivered by the gas delivery device 70, if the volume signal indicates that the volume of air in the bags 40 is above the target volume range. The central computer can adjust the amount of gas delivered by the gas delivery device 70 by opening the solenoid gas valve at an earlier or later time relative to the motion of the jaws 31 than the predetermined time to increase the length of time the solenoid valve is open.

In addition, or alternatively, the packaging machine 18 may include a first distance adjustment device 76 for adjusting the first distance 72 from a first magnitude to a second magnitude. In addition, or alternatively, the packaging machine 18 may include a second distance adjustment device 77 for adjusting the second distance 73 from a first magnitude to a second magnitude.

Two embodiments of the distance adjustment devices 76, 77 will now be discussed with reference to the first distance adjument device 76 associated with the closer bars 50. However, it will be appreciated that either embodiment could also be applied as the second distance adjustment device 77 associated with the stripper bars 49.

Figure 7A:
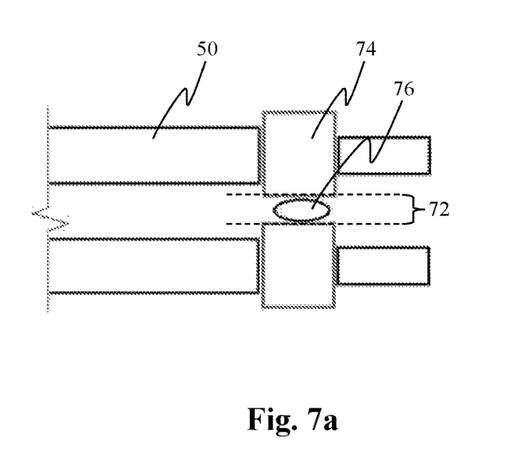
FIGS. 7a and 7b are schematic top views of a first alternative embodiment of the assembly of FIG. 1.

In a first embodiment, the first adjustment device 76 includes a shaft 76 positioned to abut the first spacers 74. The shaft 76 is rotationally asymmetric such that, when the shaft 76 is in a first position shown in FIG. 7a, a first chord of the shaft 76 taken between contact positions of the shaft with the closer bars 50 is equal to the first magnitude, such that the closer bars 50 are now separated by the first magnitude of the first distance 72.

Figure 7B:
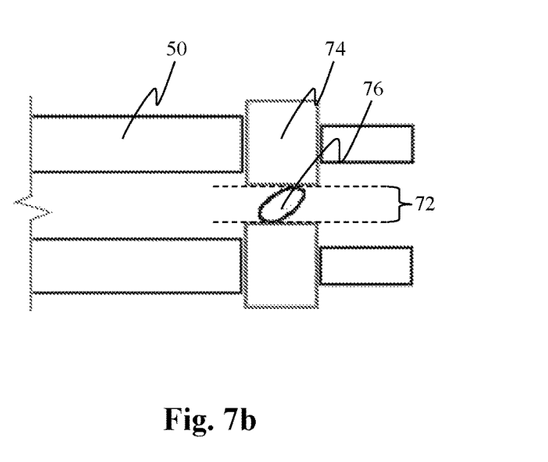

When rotated, as seen in FIG. 7b, the shaft 76 is in a second position and a second chord of the shaft taken between contact positions of the shaft 76 with the closer bars 50 is equal to the second magnitude. The shaft 76 urges the first spacers 74, and therefore the closer bars 50, apart, causing the magnitude of the first distance 72 to change to the second magnitude.

In a second embodiment, the packaging machine 18 includes both the first and second adjustment devices 76, 77, therefore having two independent shafts 76, 77 to control the first and second distance 72, 73. Thereby, the second adjustment device 77 is operable independently from the first distance adjustment device 76.

In a third embodiment, as seen in FIG. 6, the first and second distance adjustment device 76, 77 are embodied as a single shaft 76 having a first rotationally asymmetric profile 83 at a contact position of the shaft 76 with the closer bars 50, and a second shaft profile 84 at a contact position of the shaft 76 with the stripper bars 49.

Figure 8A:
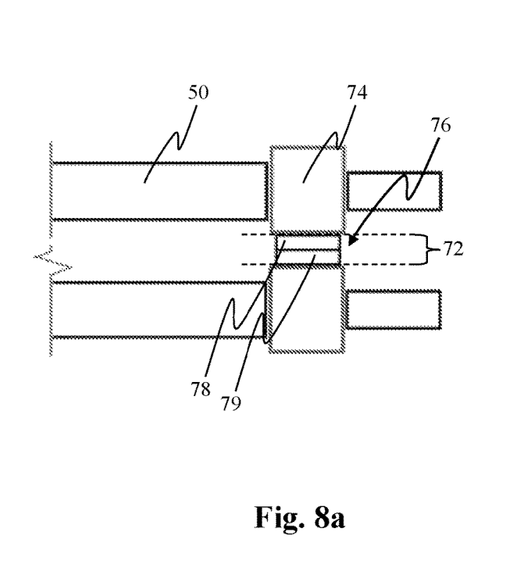
FIGS. 8a and 8b are schematic top views of a fourth alternative embodiment of the assembly of FIG. 1.
Figure 8B:
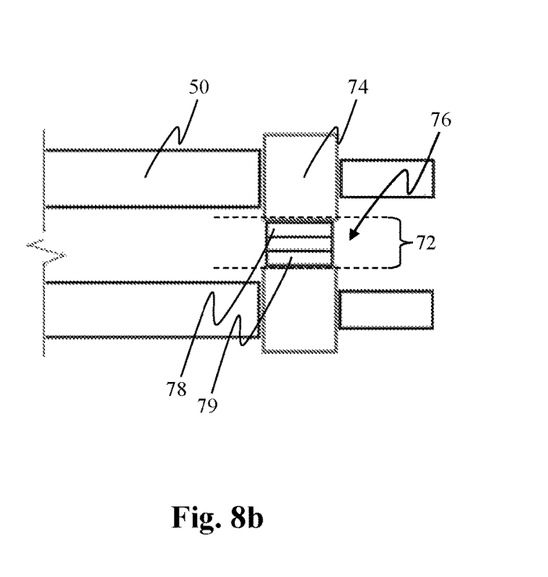
Figure 9A:
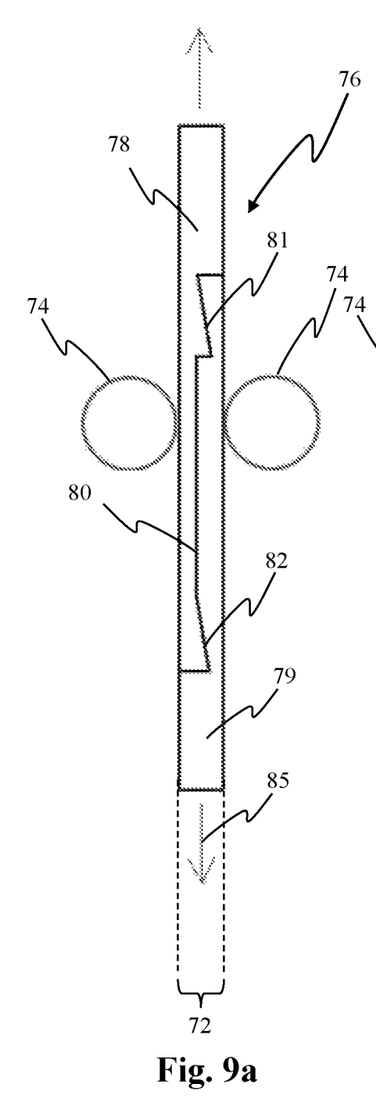
FIGS. 9a and 9b are schematic side views of the fourth alternative embodiment of the assembly of FIG. 1.
Figure 9B:
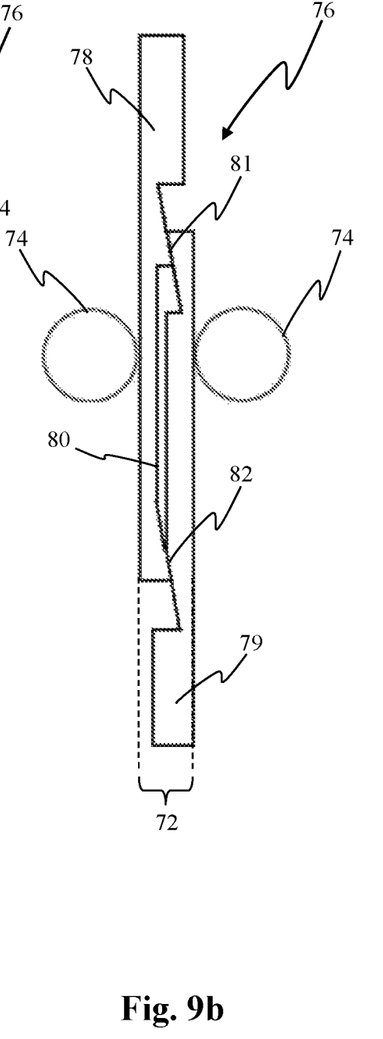

In a fourth embodiment, as seen in FIG. 8a, the first adjustment device 76 includes a wedge assembly 76 positioned to abut the closer bars 50 when the closer bars 50 are at their closest separation. The wedge assembly 76 includes a first wedge 78 and a second wedge 79. The first and second wedge 78, 79 are movable relative to each other in a first wedge direction 85 from a first position, as seen in FIG. 9a, to a second position, as seen in FIG. 9b, to change the dimension of the wedge assembly 76 in a second wedge direction, the second wedge direction being parallel with the first distance 72.

Each of the wedges 78, 79 has a conforming profile 80. The conforming profile 80 has a first slope 81 at a first end of the wedge assembly 76 and a second slope 82 at a second end of the wedge assembly 76. When the first and second wedge 78, 79 are moved relative to each other in the first wedge direction 85 to increase the first distance 72, the first and second wedge 78, 79 contact each other at the first slope 81 and at the second slope 82 of the conforming profile 80.

The central computer can adjust, in the above discussed embodiments and in response to the volume signal, the first distance 72 and/or the second distance 73 using the first and second distance adjustment device 76, 77 respectively, for example by controlling an electric motor (not shown) to drive the devices 76, 77. For example, in response to a volume signal indicating that the volume of air in the bags 40 is below the target volume range, the central computer can operate the first and/or second distance adjustment device 76, 77 to decrease the first and/or second distance 72, 73, causing air in the bag 40 to be formed to escape more slowly prior to the end seal 43 being formed. Thus, the volume of air in the bags 40 when the end seal 43 is formed by the sealing jaws 31 is increased. Similarly, in response to a volume signal indicating that the volume of air in the bags 40 is above the target volume range, the central computer can operate the first and/or second distance adjustment device 76, 77 to increase the first and/or second distance 72, 73, causing air in the bag 40 to be formed to escape more quickly prior to the end seal 43 being formed. Thus, the volume of air in the bags 40 when the end seal 43 is formed by the sealing jaws 31 is decreased.

The compression device 51 is adjustable in respect of distance from the length 37 by a "parallelogram" arrangement that includes a pair of generally parallel linkages 64. Each of the linkages 64 is pivotally attached to the device 51, and pivotally attached to the base 48, so that the length 58 remains generally parallel to the length 37.

The linkages 64 are attached to drive shafts 65 which are moved angularly about their longitudinal axes by a drive device, including a lever 66 to move the drive shafts 65 angularly about their longitudinal axes. The drive device 66 includes an electric motor, for example the linear actuator 71, and the gear box assembly 61, comprising a screw drive, and would be operated to ensure that the length 58 is located at a correct distance from the length 37 to match the size of the bags 40 being conveyed.

| | Reference Numerals: |
|---|---|
| 10 | packaging assembly |
| 11 | weighing machine |
| 12 | buckets |
| 13 | buckets |
| 14 | chute |
| 15 | former |
| 16 | direction |
| 17 | film drive assembly |
| 18 | packaging machine |
| 19A | sub-assembly |
| 19B | sub-assembly |
| 20 | belt |
| 21 | first idler roller |
| 22 | second idler roller |
| 23 | drive pulley |
| 24 | belt drive portion |
| 25 | belt portion |
| 26 | direction |
| 27 | tubular bag material |
| 28 | sealing device |
| 30 | conveyor assembly |
| 31 | sealing jaws |
| 32 | shaft |
| 33 | angular directions |
| 34 | conveyor |
| 35 | belt portion |
| 36 | endless belt |
| 37 | upper conveying length |
| 38 | conveying direction |
| 39 | downstream end |
| 40 | discrete bags |
| 40A | upper surface |
| 41 | former shoulder |
| 42 | longitudinal seal |
| 43 | end seal |
| 44 | upstream end |
| 45 | motor/gear box assembly |
| 46 | drive roller |
| 47 | jaw supports |
| 48 | base |
| 49 | stripper bars |
| 50 | closer bars |
| 51 | compression device |
| 52 | loop member |
| 53 | upper opening |
| 54 | axis |
| 55 | chain loops |
| 56 | resilient members |
| 57 | direction |
| 58 | length |
| 59 | idler sprocket assembly |
| 60 | drive sprocket assembly |
| 61 | gear box assembly |
| 62 | first sensor |
| 63 | second sensor |
| 64 | parallel linkages |
| 65 | drive shafts |
| 66 | drive device |
| 67 | strip length |
| 68 | first distance |
| 69 | second distance |
| 70 | gas delivery device |
| 71 | electric motor |
| 72 | first distance |
| 73 | second distance |
| 74 | first distance spacer |
| 75 | second distance spacer |
| 76 | first distance adjustment device |
| 77 | second distance adjustment device |
| 78 | first wedge |
| 79 | second wedge |
| 80 | conforming profile |
| 81 | first slope |
| 82 | second slope |
| 83 | first profile |
| 84 | second profile |

The invention claimed is:

1. An assembly for forming bags, the assembly including:
a former shoulder;
a controller;
a belt drive controlled by the controller for feeding a film at a film speed to the former shoulder to form a tubular film moving in a film direction;
a sealing device to seal the tubular film in a first sealing direction, the first sealing direction being parallel to the film direction;
a set of jaws controlled by the controller and movable at a jaw speed to engage and seal the tubular film in a second sealing direction to form a first seal and a second seal in each bag, thereby forming a closed bag, wherein:
the second sealing direction is generally perpendicular to the film direction, and
the first seal of each closed bag is located in the tubular film at a distance along the film direction from the second seal of the closed bag;
a conveyor to receive the closed bag and to convey the closed bag to a destination; and
a sensor assembly operatively associated with the conveyor, to provide a volume signal, the volume signal being indicative of a volume of the closed bag, to the controller;
wherein the controller can adjust at least one of the film speed and the jaw speed in response to the volume signal.

2. The assembly of claim 1, wherein, the set of jaws includes a cooperating pair of stripper bars that are operable such that, prior to the set of jaws forming the second seal of a bag to be closed, the speed of the stripper bars differs from the film speed by a relative speed, and wherein the controller can adjust the relative speed in response to the volume signal.

3. The assembly of claim 2, wherein the stripper bars are movable by a stripping distance while the relative speed is non-zero, and wherein the controller can adjust the stripping distance in response to the volume signal.

4. The assembly of claim 2, wherein the stripper bars are movable for a stripping time while the relative speed is non-zero, and wherein the controller can adjust the stripping time in response to the volume signal.

5. The assembly of claim 4, wherein the controller can adjust the stripping time by adjusting the jaw speed and the film speed such that the relative speed does not change substantially.

6. The assembly of claim 1, wherein the assembly further includes a gas delivery device positioned adjacent the former shoulder to deliver an amount of gas into the tubular bag material prior to the set of jaws forming the second seal of a bag to be closed, and
wherein the controller can adjust the amount of gas in response to the volume signal.

7. The assembly of claim 1, wherein the sensor assembly includes a first sensor, the sensor operable to detect an upper surface of the bag.

8. The assembly of claim 7, wherein the sensor assembly includes a second sensor, the second sensor being spaced from the first sensor in said conveyor direction so that the sensors are spaced along the conveyor, with both sensors being operable to provide the volume signal and the first sensor being upstream of the second sensor,
and wherein each sensor detects the upper surface of the bag.

9. An assembly for forming bags, the assembly including:
a former shoulder;
a controller;
a belt drive controlled by the controller for feeding a film at a film speed to the former shoulder to form a tubular film moving in a film direction;
a sealing device to seal the tubular film in a first sealing direction, the first sealing direction being parallel to the film direction;
a set of jaws controlled by the controller and movable at a jaw speed to engage and seal the tubular film in a second sealing direction to form a first seal and a second seal in each bag, thereby forming a closed bag, wherein the second sealing direction is generally perpendicular to the film direction, and the first seal of each closed bag is located in the tubular film at a distance along the film direction from the second seal of the closed bag; the set of jaws including cooperating pairs of:
closer bars for closing the tubular film;
stripper bars for moving, prior to the set of jaws forming the second seal of a bag to be closed, at a speed that differs from the film speed by a relative speed; and
sealing jaws for forming the first and second seal,
wherein the closer bars, when the tubular film is closed, are separated by a first distance, and the stripper bars, when moving at the relative speed, are separated by a second distance,
a conveyor to receive the closed bag and to convey the closed bag to a destination; and
a sensor assembly operatively associated with the conveyor, to provide a volume signal, the volume signal being indicative of a volume of the closed bag, to the controller; and
wherein the assembly includes:
a first distance adjustment device for adjusting the first distance and/or a second distance adjustment device for adjusting the second distance,
wherein the controller can operate the first and/or second distance adjustment device in response to the volume signal.

10. The assembly of claim 9, wherein the assembly includes both first and second distance adjustment devices.

11. The assembly of claim 9, wherein the second distance adjustment device is operable independently from the first distance adjustment device.

12. The assembly of claim 9, wherein the first and/or second distance adjustment device include:
a rotationally asymmetric shaft positioned to abut the respective bars when the bars are at their closest separation, wherein:
the shaft is movable between a first position corresponding to a first magnitude of the respective distance, and a second position corresponding to a second magnitude of the respective distance.

13. The assembly of claim 12, wherein the shaft is rotationally asymmetric such that:
when the shaft is in the first position, a first chord of the shaft taken between contact positions of the shaft with the respective bars is equal to the first magnitude, and
when the shaft is in the second position a second chord of the shaft taken between contact positions of the shaft with the respective bars is equal to the second magnitude.

14. The assembly of claim 12, wherein the first and second adjustment device include:
a rotationally asymmetric shaft having a first shaft profile at a contact position of the shaft with the closer bars and a second shaft profile at a contact position of the shaft with the stripper bars.

15. The assembly of claim 12, wherein the first distance adjustment device includes a first rotationally asymmetric shaft and the second distance adjustment device includes a second rotationally asymmetric shaft.

16. The assembly of claim 9, wherein the first and/or second adjustment device include a wedge assembly positioned to abut the respective bars when the bars are at their closest separation, the wedge assembly having:
a first wedge; and
a second wedge,
wherein the first and second wedge are movable relative to each other in a first wedge direction to change the dimension of the wedge assembly in a second wedge direction.

17. The assembly of claim 16, wherein the first wedge and the second wedge abut each other and each have a conforming profile,
wherein the conforming profile includes a first slope at a first end of the wedge assembly and a second slope at a second end of the wedge assembly, such that:
when the first and second wedge are moved relative to each other in the first wedge direction to increase the dimension of the wedge assembly in the second wedge direction, the first and second wedge contact each other at the first slope and the second slope of the conforming profile.

* * * * *